E. G. SIMPSON.
WINDOW LIFTER STOP.
APPLICATION FILED JAN. 26, 1918.
1,278,771.
Patented Sept. 10, 1918.
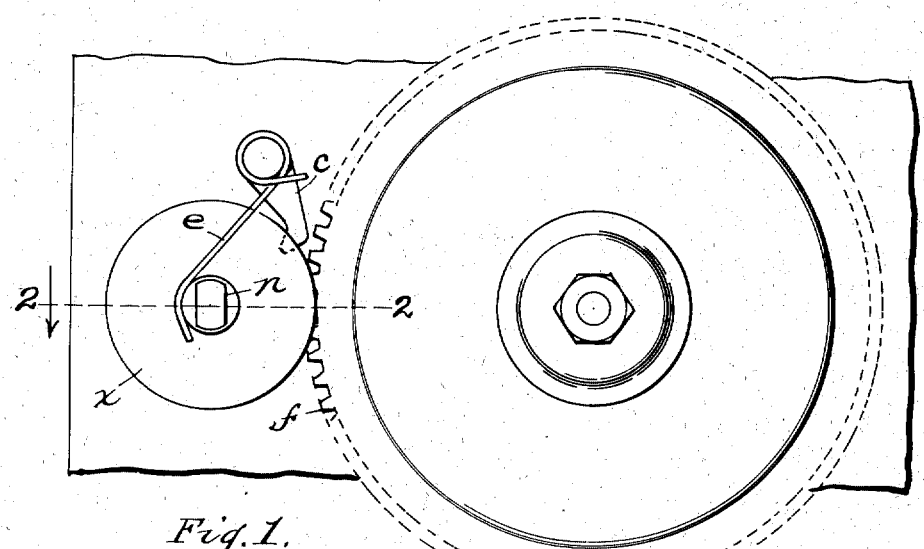
Fig. 1.
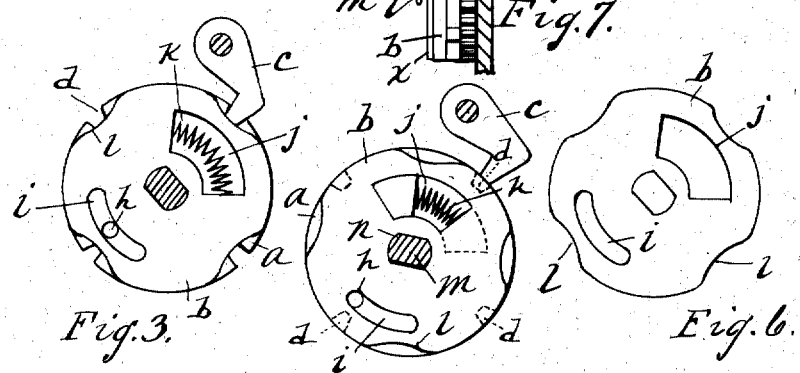
Fig. 2. Fig. 7. Fig. 5.
Fig. 3. Fig. 4. Fig. 6.
Inventor
EMORY GLENN SIMPSON.
By Stuart C. Barnes
Attorney

UNITED STATES PATENT OFFICE.

EMORY GLENN SIMPSON, OF DETROIT, MICHIGAN, ASSIGNOR TO TERNSTEDT MANUFACTURING CO., OF DETROIT, MICHIGAN, A CORPORATION OF MICHIGAN.

WINDOW-LIFTER STOP.

1,278,771.  Specification of Letters Patent.  Patented Sept. 10, 1918.

Application filed January 26, 1918. Serial No. 213,873.

*To all whom it may concern:*

Be it known that I, EMORY GLENN SIMPSON, a citizen of the United States, residing at Detroit, in the county of Wayne, State of Michigan, have invented a new and useful Improvement in Window-Lifter Stops, of which the following is a specification.

This invention relates to stops for window lifters. The stop is arranged to be automatically disengaged by rotating the spindle of the operating member. Stop devices for this purpose are not broadly new, but the device hereinafter to be described contains a number of new and important features that add to the smooth operation and simplicity of the device.

In the drawings,—

Figure 1 is an inside elevation of part of the lifting gear for a window lift, showing the outside appearance of the stop.

Fig. 2 is a cross section of the stop taken on the line 2—2 of Fig. 1.

Fig. 3 is a detail showing the dog in engagement with the locking disk.

Fig. 4 shows the dog disengaged from the notches of the locking disk and arranged to ride smoothly on the peripheries of the two disks.

Figs. 5 and 6 are details of the locking and disengaging disks respectively.

Fig. 7 is a peripheral view of the two disks.

It is not new to utilize the stop employing two disks, one of which is to lock in with the dog and the other of which is to disengage the dog by relative movement between the two disks. These devices of the prior art, however, work upon the principle of a ratchet-like disk and a companion disk for lifting the dog over the ratchet tooth as the steep side of the ratchet tooth approaches the dog. This means for each tooth on the ratchet disk the dog must be lifted. In other words, the dog first drops into a depression and then rides over the tooth, causing a clicking of the stop as the crank is rotated. This is avoided in my stop, as will be presently seen.

$a$ detailed in Fig. 5 is the locking disk. $b$ detailed in Fig. 6 is the disengaging disk. $c$ is the locking dog having a nose adapted to drop in the notches $d$ at the quarter points on the locking disk $a$ and be so engaged that the disk is positively locked against rotation in either direction. $e$ is a spring for urging the dog against the periphery of the disks.

The large driven gear $f$ meshes with the driving pinion $g$, which is connected to rotate with the disk $a$ by means of the pin $h$ which passes through a hole in the disk $a$ and which has a lost motion connection with the disengaging disk $b$ afforded by the pin $h$ engaging in the segmental slot $i$. Each of the disks is provided with a large segmental slot $j$, the two latter slots when in registry or part registry forming a spring chamber for the coil spring $k$, which will be termed a centralizing spring, for it, as shown in Fig. 3, normally tends to keep the notches $d$ of the locking disk $a$ centrally of the depressions $l$ of the disengaging disk. In this position the dog $c$, which is wide enough to ride on the peripheries of both disks (Fig. 7), is enabled to drop into the notch of the locking disk so as to lock the whole apparatus. $x$ is a collar which, in connection with the walls of the slots $j$, serves to house the spring $k$.

Now suppose one turns the crank either to raise or lower the window. This turning effort is communicated directly from the spindle $m$ to the disengaging disk $b$. Note that the end of the spindle is flattened at $n$ (Fig. 2) and the central aperture of the disengaging disk is shaped to engage this flattened portion as shown in Fig. 6, while the central aperture of the locking disk is circular and not affected by this flattened portion $n$. Consequently the driving of the pinion $g$ and the locking disk $a$ must be through the disengaging disk. The centralizing spring $k$ normally keeps the slots $j$ in registry and the notches of the disk $a$ and the depressions of the disk $b$ in registry so that the dog can drop into the notch. When, however, the spindle is moved in either direction, the disengaging disk can rotate only half the length of the segmental slot $i$, when the end of that slot will pick up the pin $h$ and lock all three members so that they rotate together, but that much relative movement which is depicted by comparing Figs. 3 and 4, has brought the high portions of the periphery of the disengaging disk under the nose of the dog and lifted it out of the recess $d$ gradually by the slope from the bottom of the depression to the main periphery of the disengaging disk.

Note that Fig. 4 shows the depressions in the disengaging disk $b$ registering with the uninterrupted peripheral portions of the locking disk $a$, and notice the notches $d$ in the locking disk $a$ register with the uninterrupted peripheral portions of the disengaging disk $b$. These two facts together result in a continuous periphery for the two disks when considered together, so that the dog will ride smoothly and noiselessly over the combined peripheries of these two disks until the turning effort is released from the spindle, whereupon the centralizing spring will immediately rotate the disengaging disk one-half the length of the slot $i$ and bring the depressions and the notches into registry so that the dog can drop into one of the notches $d$ and lock the apparatus.

This centralizing spring makes possible this arrangement. If some means for restoring the registry of the depressions and the notches were not afforded, then the way of the prior art would have to be adopted, and the pawl would have to be constantly rising and falling as it is lifted over each ratchet tooth, with the clicking noise familiar with devices of this character.

What I claim is:

1. In a stop for the purpose specified, the combination of a locking member and a disengaging member adapted to be rotated together but capable of a limited relative movement, the former provided with locking notches and the latter with depressions, whose registry with the locking notches allows the notches to function, a locking device for dropping into one of the notches when they are in registry with the depressions, means for normally keeping the depressions and notches in registry, and means for turning the disengaging member whose initial relative movement with respect to the locking member disengages the locking device which cannot again function until the turning effort ceases.

2. A stop for the purpose specified, having in combination, a spindle, a disengaging disk provided with a plurality of depressions and connected with the spindle to rotate therewith, a notched locking disk free to rotate upon the spindle and having a lost motion driven connection with the disengaging disk, means for normally keeping the two disks so that the depressions and notches are in registry, and a locking dog adapted to drop into one of the notches when the depressions and notches are in registry and restrained from dropping into the notches when they are out of registry which is brought about when turning effort is exercised upon the spindle.

3. A stop device for the purpose specified, comprising a spindle, a disengaging disk arranged to rotate with the spindle and having depressions in its periphery, a locking disk having notches in its periphery and free to turn upon the spindle but having a lost motion driven connection with the disengaging disk, each of the disks being slotted to form a spring chamber, and a coil spring engaging in said spring chamber and normally adapted to keep the depressions and the notches in registry, and a locking dog adapted to drop into one of the notches when the notches and depressions register and adapted to ride uninterruptedly upon the periphery of the two disks when the notches and the depressions do not register caused by turning effort being exercised upon the spindle.

4. In a stop device for the purpose specified, a locking disk, a disengaging disk, the two capable of a limited relative movement, the locking disk having locking portions on the periphery and the disengaging disk having disengaging portions on the periphery, and a locking device disengaged from the locking portions of the locking disk by the initial relative movement of the disks and caused to uninterruptedly ride on the periphery of the two disks as long as turning effort is exercised upon the disengaging disk.

5. A stop for the purpose specified, having in combination, a spindle, a disengaging disk provided with a plurality of depressions and connected with the spindle to rotate therewith, a notched locking disk free to rotate upon the spindle and having a lost motion driven connection with the disengaging disk, and a locking dog adapted to drop into one of the notches when the depressions and notches are in registry and restrained from dropping into the notches when they are out of registry which is brought about when turning effort is exercised upon the spindle.

In witness whereof I have hereunto set my hand on the 17th day of January, 1918.

EMORY GLENN SIMPSON.